March 11, 1958 V. E. ANDERSON 2,826,336
AUTOMATIC PATCH STRIP FEED FOR PATCHING MACHINE
Filed Oct. 26, 1953 2 Sheets-Sheet 1
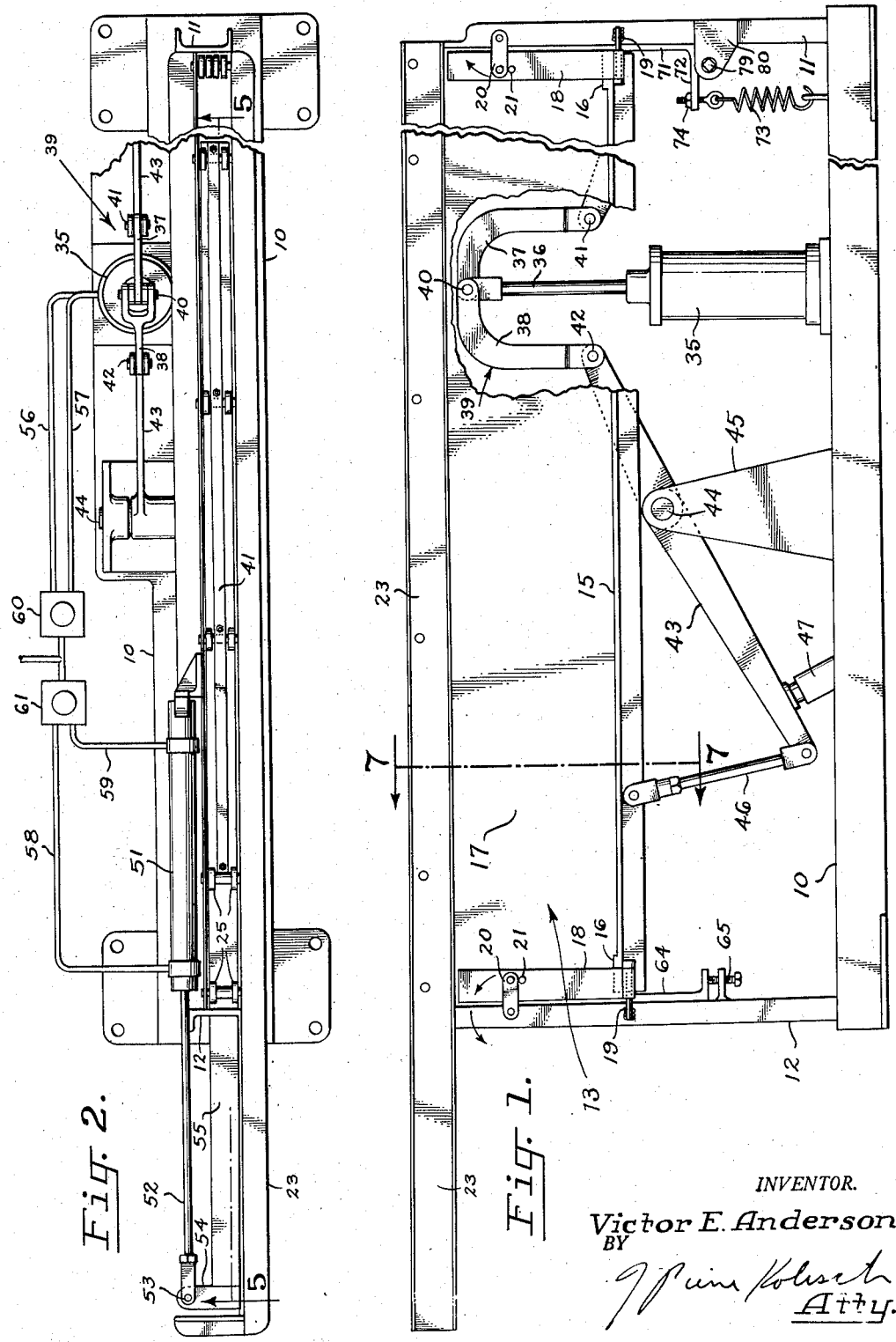
INVENTOR.
Victor E. Anderson March 11, 1958   V. E. ANDERSON   2,826,336
AUTOMATIC PATCH STRIP FEED FOR PATCHING MACHINE
Filed Oct. 26, 1953   2 Sheets-Sheet 2
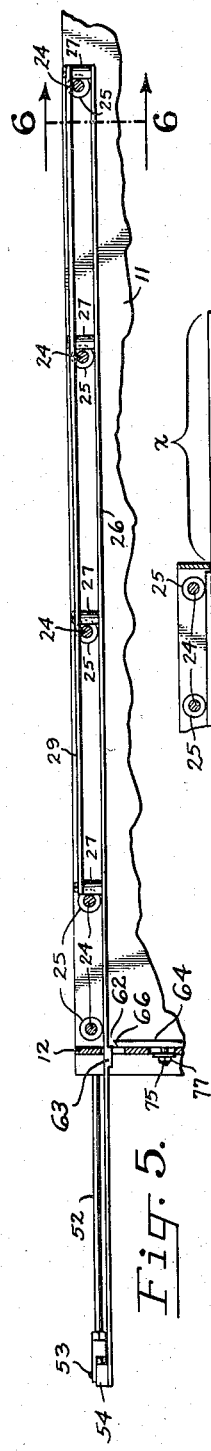
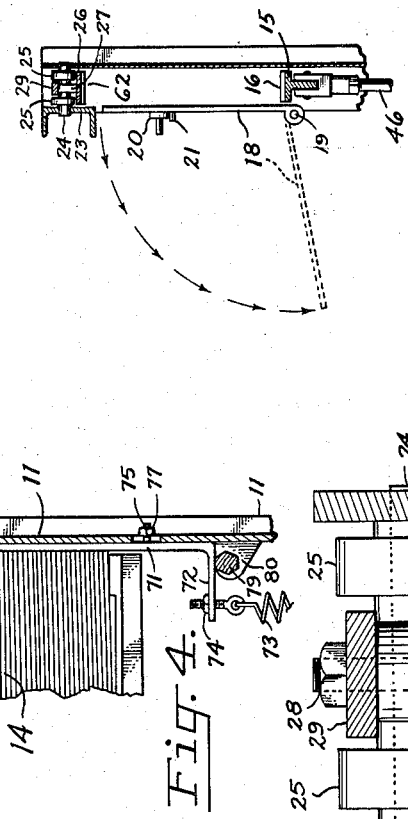
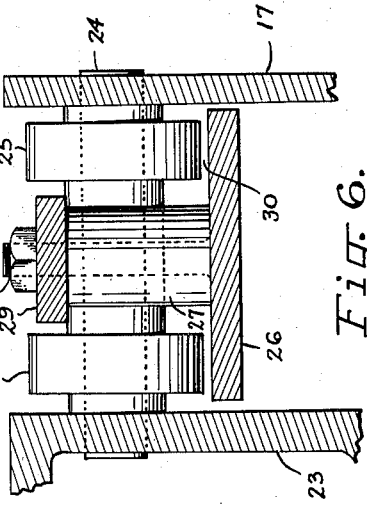
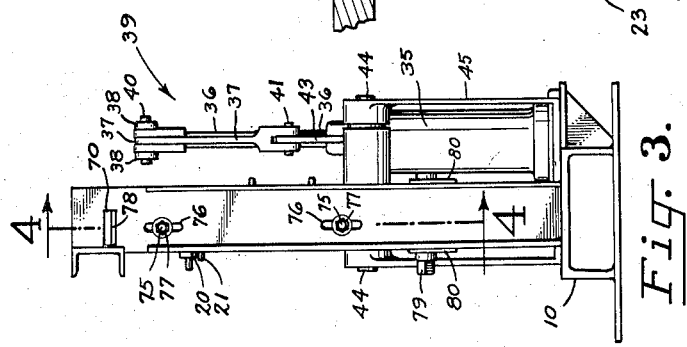
INVENTOR.
Victor E. Anderson
BY
Atty.

United States Patent Office 2,826,336
Patented Mar. 11, 1958

2,826,336

AUTOMATIC PATCH STRIP FEED FOR PATCHING MACHINE

Victor E. Anderson, Portland, Oreg., assignor to Prentice Machine Works, Inc., Portland, Oreg., a corporation of Oregon Application October 26, 1953, Serial No. 388,153

7 Claims. (Cl. 221—232)

This invention relates to a machine for automatically dispensing strips of long, narrow, relatively rigid material, and particularly veneer patch strips used in patching sheets of veneer.

Certain types of automatic patching machines, such as the Raimann ASA machine used to punch out defective areas in sheets of veneer and replace them with sound veneer, employ long strips of relatively narrow veneer from which patches of sound veneer are cut and inserted in the veneer sheets to replace defective areas. These narrow strips of veneer are usually fed into the patching machine lengthwise by hand one at a time. After the machine has used up one of these strips, it is necessary to stop the machine and load another strip into it. An automatic patching machine is capable of being operated at a relatively high speed in the hands of a skilled operator, and uses up patch strips rapidly. According to known methods of loading an automatic patching machine, its operation is materially slowed down by the necessity of frequently stopping the machine in order to load it with patch strips.

The present invention is designed to overcome this disadvantage and provide a constant supply of patch strips to the machine, so that it will be unnecessary to stop the machine in order to load patch strips therein.

Generally the apparatus by which this is accomplished comprises a magazine for receiving a stack of patch strips which are placed on a vertically movable supporting member which always maintains one strip in correct vertical position for insertion into the patching machine. When a new strip is required in the patching machine, a horizontally operated ram engages the top strip in the magazine and pushes it through an adjustable slot in the end of the loader into the patching machine up to a point where it may be engaged by feed mechanism in the patching machine which thereafter takes over feeding the strips into the patching machine.

The machine, according to the invention, will be described in greater detail with reference to the following drawings in which:

Fig. 1 is a side elevation, partially broken away, of the machine;

Fig. 2 is a top plan view of the machine;

Fig. 3 is an end view of the machine;

Fig. 4 is a view of one end of the machine on the lines 4—4 of Fig. 3;

Fig. 5 is a view on the lines 5—5 of Fig. 2;

Fig. 6 is a section on line 6—6 of Fig. 5; and

Fig. 7 is a section on the line 7—7 of Fig. 1.

The machine comprises a base 10, supporting two upstanding side members 11 and 12, between which a magazine, generally indicated at 13, is provided for receiving a vertical stack of veneer strips 14 (Fig. 4). In between sides 11 and 12 there is provided a bottom support or plate 15 which has pads or raised portions 16 at either end for the purpose of raising the opposite ends of the veneer strips and cause them to sag in the middle for a purpose to be described later. The back of the magazine is closed by a plate 17 and the front of the magazine is open except for two narrow doors 18 at either end which are connected to sides 11, 12 by hinges 19. When it is desired to load the magazine, doors 18 are dropped down, permitting a stack of patch strips to be placed in the magazine. When the patch strips are in place, the doors are raised and latches 20 on sides 11, 12 rotated until they engage stops 21 on the doors.

The top of the magazine comprises a plate 23 extending from side 11 beyond side 12. A plurality of stub shafts 24 extend between plate 23 and the top back wall 17 of the magazine. A pair of rollers 25 are mounted on each of shafts 24 which carry on their bottom sides a free-floating, horizontal bar 26 which is connected by spacers 27 and nut and bolt arrangement 28 to another horizontal bar 29 on the upper sides of shafts 24. It will be noted that a space 30 is provided between the top surface of bar 26 and the bottom periphery of rollers 25, so that when the stack of patch strips is lifted against bar 26, the bar is free to move against the rollers. Bar 26 engages the rollers when a stack of veneer has been loaded into the magazine and plate 15 raised sufficiently so that the top strip of veneer moves the bar against the bottom of rollers 25. Bar 26 is free floating so as to facilitate lateral movement of the bar to the right during ejection of a strip through a slot in side 11 of the magazine, as hereinafter more fully described.

Bottom plate 15 in the magazine is moved by means of a vertically positioned hydraulic cylinder 35, having a piston 36 which is connected to two angle shaped links 37, 38 which form an articulated yoke, generally indicated at 39. Yoke 39 has pivotal connections at points 40, 41 and 42, and is connected to similar lever mechanisms on either side, only the left hand mechanism being shown. Link 38 is connected to one end of lever 43 pivotally supported at 44, from a supporting bracket 45 upstanding from base 10. The other end of lever 43 is connected to a rod 46 which is fastened to the bottom of supporting plate 15. A snubber 47 is mounted on base 10 and projects therefrom to engage the lowermost end of lever 43 and limit its downward movement when the bottom plate 15 is depressed.

The mechanism for ejecting from the magazine the topmost strip in the stack of veneer comprises a horizontally positioned air cylinder 51 which is mounted near the top of the magazine on back wall 17. Piston 52 of the cylinder is pivotally connected at 53 to link 54 extending from a horizontal ram 55 which is an extension of bar 26.

Cylinder 51, as well as cylinder 35, is connected by suitable lines 56, 57, 58 and 59 to control valves 60 and 61 for controlling the operations of the cylinders in the conventional manner in response to signals coming either directly from the veneer patching machine or from manual controls.

Ram 55 is adapted to enter the top of the magazine through an opening 62 and by means of a depending lip or projection 63 on the bottom of ram 55 which is within magazine 13 to engage the left hand rear edge of the topmost patch strip of stack 14 in the magazine and move it horizontally a distance X, as indicated in Fig. 4, out of the magazine and into the patching machine (not shown) where its feeding mechanism takes over to pull the patch strip the rest of the way out of the magazine and into the patcher. The depth of opening 62 can be varied by means of a vertically adjustable bar 64 mounted on the inside face of side 12. By means of an adjusting screw 65 (Fig. 1) the end 66 (Fig. 5) of bar 64 may be vertically moved to vary the opening 62. This is done depending on the thickness of the stock of the patch strips used in the machine.

At the other end of the machine a slot 70 through which the strips are ejected from the magazine is provided in side 11. An elongated bar 71 has a flanged end 72 which is held to base 10 by spring 73 and nut and bolt arrangement 74. Bar 71 is mounted on the inside face of side member 11 and, as best seen in Figs. 3 and 4, bolts 75 extending from bar 71 into longitudinal slots 76 in side 11 permit vertical movement of the bar which is held to the side by nuts 77 screwed on bolts 75. End 78 of bar 71 may be moved up or down to vary the depth of slot 70 by the manual operation of a hexagonally shaped cam 79 mounted on an ear 80 on side 11 beneath flange 72 of bar 71. The different faces of cam 79 are cut to different depths and depending upon which face of the cam engages the bottom of flange 72, end 78 of the bar will be accordingly moved up or down to vary slot 70. The thickness of the veneer being patched in the patching machine will determine the thickness of the patch strips in the loader and bar 71 will be moved up or down to vary slot 70 so that only one patch strip can be pushed out of the slot in the magazine at a time by ram 55.

The machine operates in the following manner:

A stack of veneer patch strips 14 are loaded into magazine 13 and doors 18 are latched shut. Cylinder 35 is operated by some conventional control mechanism, not shown, and the stack of strips is lifted upwardly in the magazine by bottom plate 15 until the top strip has pressed top bar 26 against rollers 25. When a new strip is required in the patching machine, horizontal cylinder 51 is actuated by conventional control mechanism, not shown, and ram 55 is moved horizontally into the magazine. Projection 63 on the ram engages the end of the top strip and pushes it out of the other end of the magazine through slot 70 a distance X which is sufficient to put it within reach of the feeding mechanism associated with the patching machine.

It will be noted from Fig. 4 that the stack of strips sags towards the middle. This condition is brought about by raised portions 16 on bottom plate 15 and reduces the amount of contacting surface and thus frictional engagement between the topmost strip and the one underneath it when ram 55 is operated. The sagging condition of the strips combined with the adjustability of the depth of slot 70 insure that only one strip will be ejected from the magazine at a time.

While a preferred embodiment of the invention has here been disclosed, it will be obvious to those skilled in the art that modifications and changes can be made thereto. It is intended to cover all such modifications and changes and limit the invention only by the appended claims.

I claim:

1. A machine for automatically dispensing patch strips one at a time, comprising a magazine having a top, bottom and sides for receiving a stack of said strips one on top of the other, a vertically positioned air cylinder, connecting means between the air cylinder and the bottom of the magazine whereby the bottom may be vertically moved, a horizontally positioned air cylinder at the top and to one side of the magazine, a ram connected to said horizontal cylinder and horizontally slidable into the top of the magazine to engage one end of the topmost patch strip, a slot in the top of the side of the magazine opposite said ram through which said topmost patch strip is ejected, cam actuated means for varying the size of the slot, and means for controlling the operation of said cylinders.

2. The machine according to claim 1 and in which the top of the magazine comprises a free floating bar engageable by rollers supported from stub shafts.

3. The machine according to claim 1 and in which said vertical cylinder has an articulated yoke, two levers connected to said yoke, two rods connected to said levers and to the bottom of the magazine.

4. The machine according to claim 1 and in which cam actuated means comprises an elongated bar one end of which is adjacent the slot in the side of the magazine, the other end of the bar is under spring tension, a cam engaging the underside of the bar near its spring tensioned end and movable to different positions whereby the remote end of the bar will be vertically moved to increase or decrease the depth of the slot.

5. The machine according to claim 1 and in which the bottom of the magazine is a flat plate having raised portions at its opposite ends whereby when strips of veneer are stacked on said plate they will tend to sag in the middle.

6. The machine according to claim 1 and in which the front of the magazine is open except for two movable door members at either end of the magazine adapted to engage opposite ends of the patch strips to retain them in the magazine.

7. The machine according to claim 1 and a slot in the end of the magazine through which said ram may pass to engage the end of a patch strip, a vertically adjustable bar in the side of the magazine in which said slot is provided, one end of said bar movable into said slot, an adjusting screw engaging the other end of said bar whereby the bar may be vertically moved.

References Cited in the file of this patent

UNITED STATES PATENTS

| | | |
|---|---|---|
| 1,247,225 | Cloovas | Nov. 20, 1917 |
| 1,434,061 | Lewis | Oct. 31, 1922 |
| 1,705,570 | Horstkotte | Mar. 19, 1929 |
| 2,463,928 | Wennerberg | Mar. 8, 1949 |
| 2,565,207 | Demler | Aug. 21, 1951 |